United States Patent
Kanamaru et al.

(10) Patent No.: US 7,586,038 B2
(45) Date of Patent: Sep. 8, 2009

(54) ELECTRICAL JUNCTION BOX AND ASSEMBLING METHOD THEREOF

(75) Inventors: Masahiro Kanamaru, Shizuoka-ken (JP); Makoto Nakayama, Shizuoka-ken (JP); Tarou Inoue, Shizuoka-ken (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 11/959,788

(22) Filed: Dec. 19, 2007

(65) Prior Publication Data

US 2008/0149385 A1 Jun. 26, 2008

(30) Foreign Application Priority Data

Dec. 21, 2006 (JP) ............ 2006-344219
Apr. 19, 2007 (JP) ............ 2007-110644

(51) Int. Cl.
 *H02G 3/08* (2006.01)
 *H02G 3/16* (2006.01)
(52) U.S. Cl. ............ 174/50; 174/489; 174/68.1; 174/72 A; 439/76.1; 439/76.2; 439/535
(58) Field of Classification Search ............ 174/50, 174/53, 57, 58, 59, 17 R, 72 A, 66, 67, 520, 174/489, 480, 481; 220/3.2, 3.3, 3.8, 3.9, 220/4.02; 439/76.1, 76.2, 949, 465, 470; 361/600, 601, 679, 724, 725, 727, 752, 756
 See application file for complete search history.

(56) References Cited

U.S. PATENT DOCUMENTS

| | | | | |
|---|---|---|---|---|
| 5,674,090 | A * | 10/1997 | Sumida et al. | 439/535 |
| 5,897,392 | A * | 4/1999 | Takahashi et al. | 439/470 |
| 6,121,548 | A * | 9/2000 | Matsuoka | 174/59 |
| 6,126,458 | A * | 10/2000 | Gregory et al. | 439/76.2 |
| 6,462,270 | B1 * | 10/2002 | Depp et al. | 174/50 |
| 6,605,780 | B2 * | 8/2003 | Chiriku et al. | 174/60 |
| 6,768,054 | B2 * | 7/2004 | Sato et al. | 174/50 |
| 7,132,600 | B2 * | 11/2006 | Kaneko | 174/480 |
| 7,172,440 | B2 * | 2/2007 | Kanamaru | 439/949 |
| 7,195,515 | B2 * | 3/2007 | Kanamaru | 439/465 |
| 7,422,443 | B2 * | 9/2008 | Kaneko et al. | 439/76.2 |

FOREIGN PATENT DOCUMENTS

JP 2005-185010 7/2005

* cited by examiner

*Primary Examiner*—Angel R Estrada
(74) *Attorney, Agent, or Firm*—Finnegan, Henderson, Farabow, Garrett & Dunner, L.L.P.

(57) ABSTRACT

An electrical junction box is provided to reduce looseness of a cover. The electrical junction box includes a box body and the cover to be slidably mounted on a lateral side of the box body from above. The cover has a front wall and a pair of left and right sidewalls connected to both left and right ends of the front wall to overlap with left and right connecting walls of the box body, providing a U-shaped cross section. The electrical junction box further includes first slide guides provided on both of the cover and the box body and second slide guides provided on both of the cover and the box body. The second slide guides are positioned in areas where the left and right sidewalls of the cover overlapping with the left and right connecting walls of the box body. Further, the second slide guides are closer to the front wall of the cover being mounted to the box body than the first slide guides.

7 Claims, 13 Drawing Sheets

ELECTRICAL JUNCTION BOX AND ASSEMBLING METHOD THEREOF

BACKGROUND OF THE INVENTION

1. Field of the Invention

The present invention relates to an electrical junction box mounted on an automobile and an assembling method of the electrical junction box.

2. Description of the Related Art

In order to protect a wire harness extending from an electrical junction box in proximity of its box body, commonly, a cover is mounted to the box body after assembling the wire harness to the electrical junction box. Japanese Patent Application Laid-open No. 2005-185010 discloses an electrical junction box where both a box body and a cover are provided with common slide guides allowing the cover to be slidably mounted to the box body.

As an example of the slide guides, there is employed a combination of one protrusion (e.g. rib) and one depression (e.g. groove) both extending in the sliding direction of the slide guides successively. Then, it is often the case that the slide guides (i.e. protrusion and depression) is configured so as to allow their movements only in the sliding direction while restricting their movements in the other directions. Thus, the slide guides also serves as means for engaging two components (box body and cover) with each other.

In most cases, the slide guides widely adopted in an electrical junction box are formed with dimensional allowances (or plays) in view of effecting the slide movement smoothly since the slide guides usually comprise a protrusion and a depression both made of resinous material. However, if the slide guides are provided with too little allowances, then a worker cannot perform a sliding operation to mount the cover to the box body smoothly. Conversely, if the slide guides are provided with too large allowances, the so-assembled electrical junction box is subjected to large looseness. Taking the molding quality for slide guides into consideration, accordingly, the dimensional allowances of the slide guides are presently set to appropriate values.

Suppose an electrical junction box where the cover is attached to the box body so as to project from a lateral side of the box body sideways. In connection, if the cover is provided, at its leading end, with a slide guide for engagement with another slide guide on the side of the box body, then a play produced between both of the slide guides causes the cover to be rattled since the box body carries the cover as if it were a cantilever. In a cover's part having a great projecting dimension from the box body, especially, the cover would be greatly displaced in rattling because such a cover's part is far from the slide guides. Thus, due to such a great displacement of the cover in ratting, there may be caused an occurrence of noise depending on the circumstances.

SUMMARY OF THE INVENTION

Under the circumstances, it is therefore an object of the present invention to provide an electrical junction box which allows looseness of a cover to be reduced as much as possible, the cover overhanging beside a box body of the electrical junction box, and an assembling method of the electrical junction box.

A first aspect of the present invention is an electrical junction box comprising, a box body configured to accommodate an electrical component, the box body having a pair of left and right connecting walls formed to project from a lateral side of the box body outwardly; and a cover to be slidably mounted on the lateral side of the box body from above, the cover having a front wall and a pair of left and right sidewalls connected to both left and right ends of the front wall to provide a U-shaped cross section, the left and right sidewalls overlapping with the left and right connecting walls of the box body under condition that the cover is mounted to the box body, wherein both of the cover and the box body have first slide guides to guide a downward sliding of the cover in mounting from the above, both of the cover and the box body have second slide guides to guide the downward sliding of the cover in mounting from the above, and the second slide guides are positioned in areas where the left and right sidewalls of the cover overlap with the left and right connecting walls of the box body, the second slide guides being closer to the front wall of the cover mounted to the box body than the first slide guides.

According to the first aspect of the invention, as the first and second slide guides are provided so that the second slide guides is closer to the front wall of the cover mounted to the box body than the first slide guides, in other words, the first and second slide guides are arranged in two different positions (inner-side and outer-side) in view from the outside of the cover, it is possible to reduce looseness (rattling) of the cover.

Assume in FIG. 9A, a play angle $\theta 1$ about the first slide guides coincides with an angular range between lines $\alpha 1$ and $\alpha 2$, while a play angle $\theta 2$ about the second slide guides coincides with an angular range between lines $\alpha 3$ and $\alpha 4$. Then, as shown in FIG. 9B, an overlapping range $\theta$ of the former range with the latter range, that is, an angular range between lines $\alpha 3$ and $\alpha 2$ represents an overall play angle of the cover. Consequently, as the total amount of play is reduced by the provision of the first and second slide guides, it is possible to reduce the looseness of the cover.

Additionally, owing to the provision of the second slide guides on the near side of a viewer (worker), it is possible to reduce a displacement of a lower end of a front wall of the cover under a great influence of the looseness of the cover. That is, if the electrical junction box is provided with only the first slide guides at the leading end of the cover, a displacement of the lower end of the front wall of the cover gets large (in comparison with the present electrical junction box under the same angle of looseness) because a distance between the lower end and the first slide guides is large. According to the present electrical junction box that is provided with not only the first slide guides but also the second slide guides on the near side, it is possible to reduce the displacement of the lower end of the front wall because of its smallness in the distance.

The second slide guides may be arranged so as to extend downwardly of the first slide guides in a sliding direction of the cover in mounting.

With the above configuration, since the second slide guides are lower than the first slide guides, the positioning of the first and second slide guides allows the looseness of a lower end of the front wall of the cover to be further reduced because the lower end is close to the second slide guides.

The first slide guides and the second slide guides may be constructed so that a play for the cover in a direction perpendicular to a sliding direction of the cover in mounting is large at each inlet of the first and second slide guides and gets smaller as advancing deeper in the sliding direction.

With the above configuration, as the first and second slide guides are together constructed so that the play for the cover in the direction perpendicular to the sliding direction of the cover is large at each inlet of the first and second slide guides and also gets smaller as advancing deeper in the sliding direction, a worker can engage the cover with the box body easily with the large play at the initial stage of mounting. Nevertheless, the worker could fix the cover in the appropriate position on the box body closely as a result of removing the play at the closing stage of mounting.

In case of leading a wire harness, which has been drawn out of the box body through the lateral side, downwardly from an upper part of the box body along its exterior surface and further extending the wire harness horizontally, there is the possibility that when mounting the cover to the box body, the cover might be inserted while strongly rubbing its body against the wire harness due to its property of rebound (i.e. elasticity) or largeness in diameter. According to the present invention, however, there is less possibility of such rubbing of the cover during the mounting operation.

That is, as the posture of the cover has a great degree of freedom at the initial stage of mounting the cover, it is possible for a worker to mount the cover to the box body without applying unreasonable stress on the wire harness. With the progress of mounting at the closing stage, since the restricting function by the first and second slide guides becomes more effective, it is possible to bring the cover into the final position while bearing down the wire harness from its outside. Consequently, it is possible to alleviate the phenomenon where the wire harness apt to rebound is severely rubbed by the cover during the mounting operation, preventing the outer periphery of the wire harness from being damaged. Further, it is possible to reduce a worker's burden in mounting the cover to the box body.

Each of the first slide guides and the second slide guides may include slide grooves formed on the box body and protrusions formed on the cover to slidably engage in the slide grooves respectively, and a groove edge defining each of the slide grooves at the inlet may be slanted to the sliding direction of the cover, thereby providing the play being large at the inlet.

With the above configuration, by only slanting the groove edge of each side groove of the box body at the inlet, it is possible to posture the cover to a direction to reduce the cover's pressure on the wire harness.

The cover may be an element to be mounted to the box body after wiring a wire harness on an exterior surface of the lateral side of the box body, the wired wire harness being pressed by the mounted cover, the box body may have a frontal-open type wiring groove formed on the exterior surface to accommodate the wire harness drawn out of the box body through the lateral side and further led from an upper part of the lateral side downwardly, the wire groove having a U-shaped cross section, and the pair of left and right connecting walls may be arranged on both sides of the wiring groove.

With the above configuration, owing to the provision of the wiring groove on the exterior surface of the lateral side of the box body, it is possible to lead the wire harness from the upside of the box body to the underside through the wiring groove. Additionally, by putting the cover on the wire harness, it is possible to hold the wire harness stably while suppressing its rebound.

The cover may have the first slide guides on each leading end of the left and right sidewalls of the cover.

A second aspect of the present invention is a method of assembling an electrical junction box, the method comprising the steps of: preparing a wire harness, a box body configured to accommodate an electrical component, the box body having a pair of left and right connecting walls formed to project from a lateral side of the box body outwardly, and a cover to be slidably mounted on the lateral side of the box body from above, the cover having a front wall and a pair of left and right sidewalls connected to both left and right ends of the front wall to provide a U-shaped cross section, the left and right sidewalls overlapping with the left and right connecting walls of the box body under condition that the cover is mounted to the box body, wherein both of the cover and the box body have first slide guides to guide a downward sliding of the cover in mounting from the above, both of the cover and the box body have second slide guides to guide the downward sliding of the cover in mounting from the above, and the second slide guides are positioned in areas where the left and right sidewalls of the cover overlap with the left and right connecting walls of the box body, the second slide guides being closer to the front wall of the cover mounted to the box body than the first slide guides; drawing the wire harness out of the box body through the lateral side of the box body; successively leading the wire harness from an upper part of the lateral side of the box body downwardly through an interval between the pair of the left and right connecting walls projecting from the lateral side of the box body, and mounting the cover to the box body while engaging the first and second slide guides of the cover with the first and second slide guides of the box body, wherein the mounting step includes: inserting the cover into the box body while inclining the cover so that a cover's lower end opens to an outside of the box body at an initial stage of the mounting step, and inserting the cover into the box body while attracting the cover's lower end to the box body with guidances of the first and second slide guides at a final stage of the mounting step.

According to the second aspect of the invention, at the initial stage of mounting, the cover is inserted into the box body while inclining the cover so that a cover's lower end opens to the outside of the electrical junction box. Then, at the final stage of mounting, the cover is inserted into the box body while attracting the cover's lower end to the box body with the guidance of the first and second slide guides. Accordingly, it is possible to mount the cover to the box body while avoiding its friction with the wire harness as possible and also possible for the cover to bear down on the wire harness at the completion of mounting certainly.

These and other objects and features of the present invention will become more fully apparent from the following description and appended claims taken in conjunction with the accompany drawings.

BRIEF DESCRIPTION OF THE DRAWINGS

FIGS. 9A and 9B are views explaining the possibility of reducing looseness by two slide guides, in which FIG. 9A is a view explaining magnitudes of respective plays of the first and second slide guides, and FIG. 9B is a view explaining reduction of the plays.

FIGS. 10A, 10B and 10C are schematic views explaining a wear issue about a wire harness in mounting the cover to the box body, in which FIG. 10A is a side view showing the possibility of a great wearing caused by sliding the cover uprightly, FIG. 10B is a side view showing an operation of mounting the cover obliquely to dissolve the wear issue, and FIG. 10C is a side view showing a condition just before the final stage of operation.

DESCRIPTION OF THE PREFERRED EMBODIMENT

An embodiment of the present invention will be described with reference to the drawings.

Figure 1:
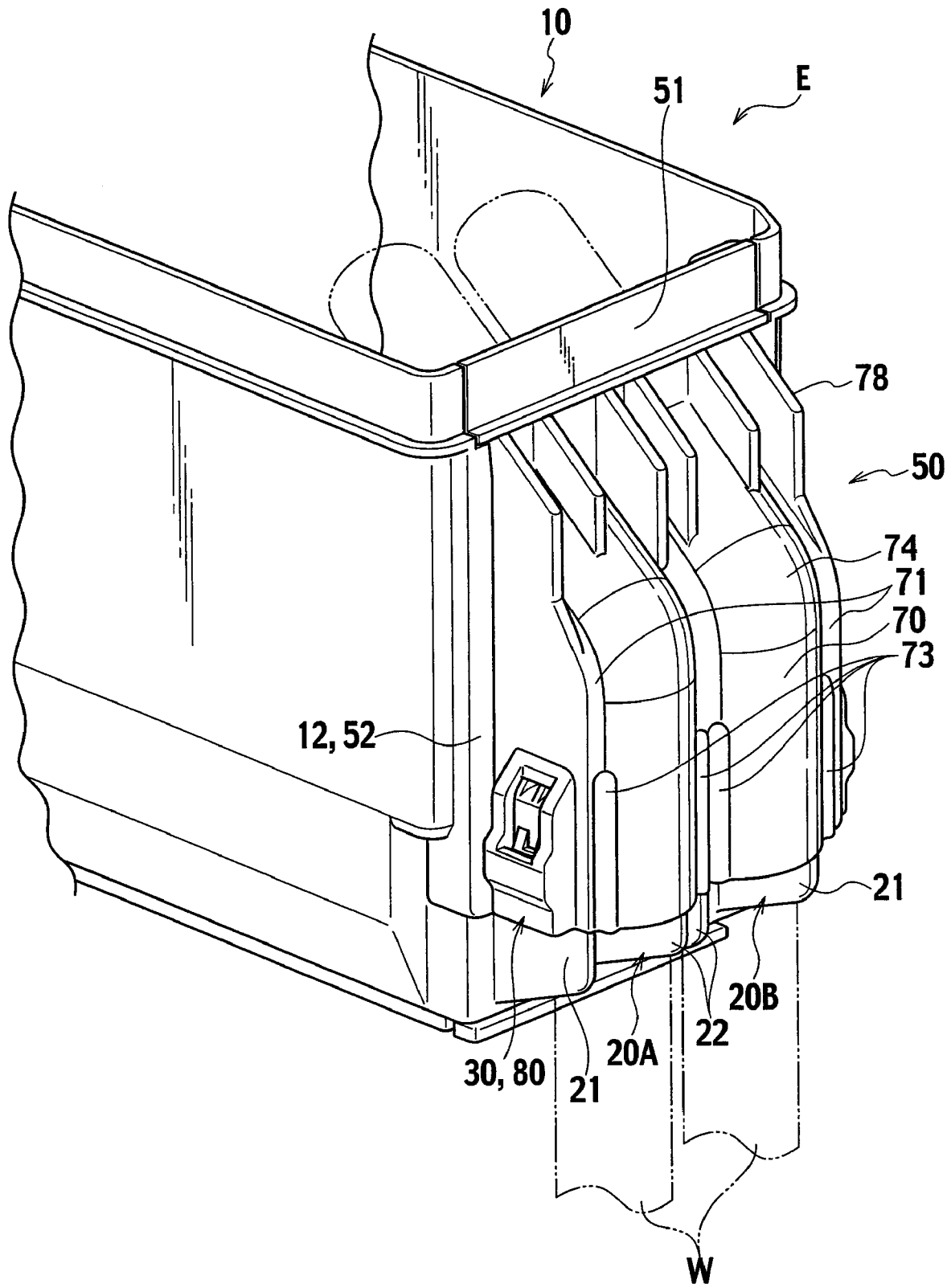
FIG. 1 is a perspective view of the substantial part of an electrical junction box having a box body and a cover in an assembled state, in accordance with an embodiment of the present invention.
Figure 2:
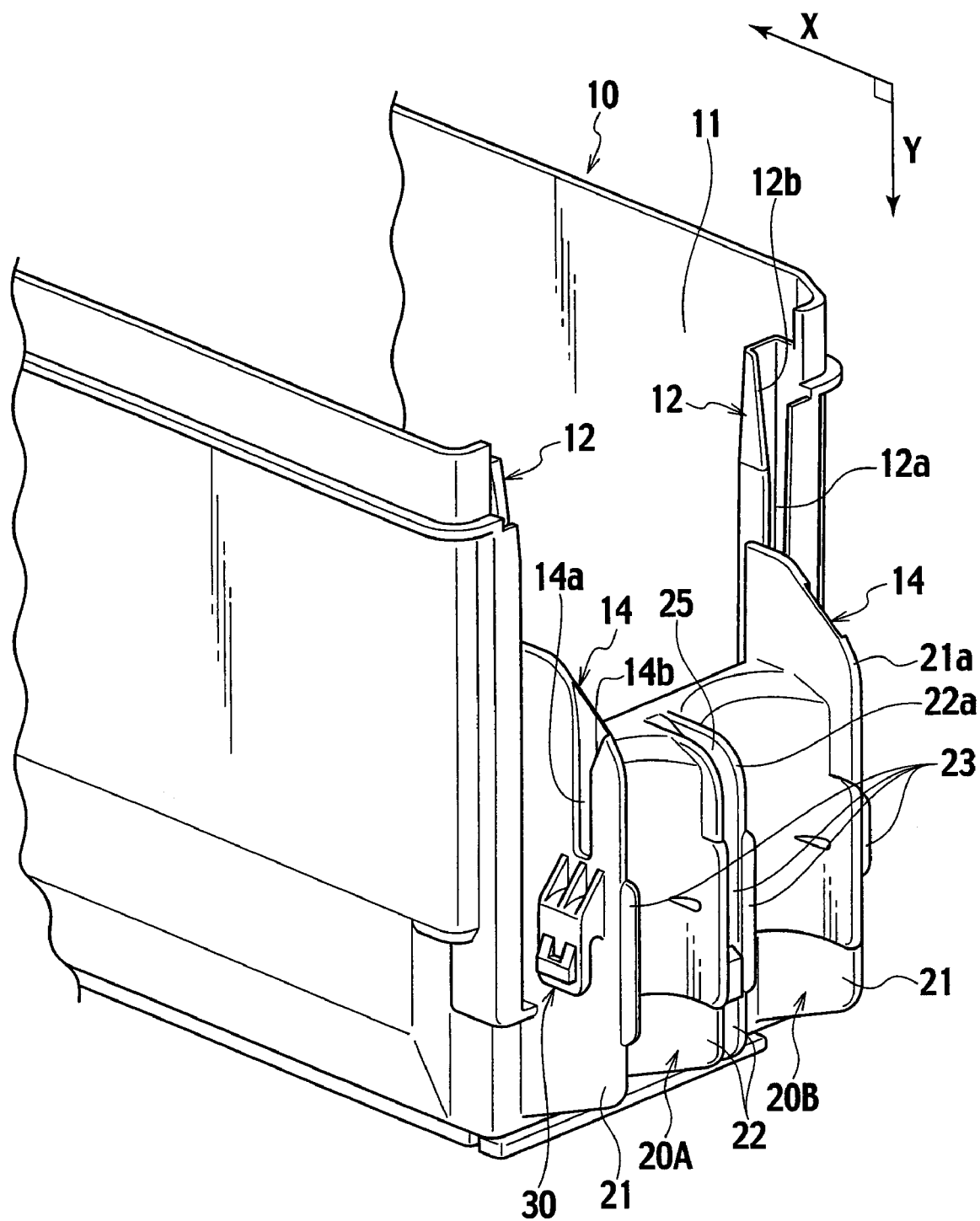
FIG. 2 is a perspective view of the substantial part of the box body.
Figure 3:
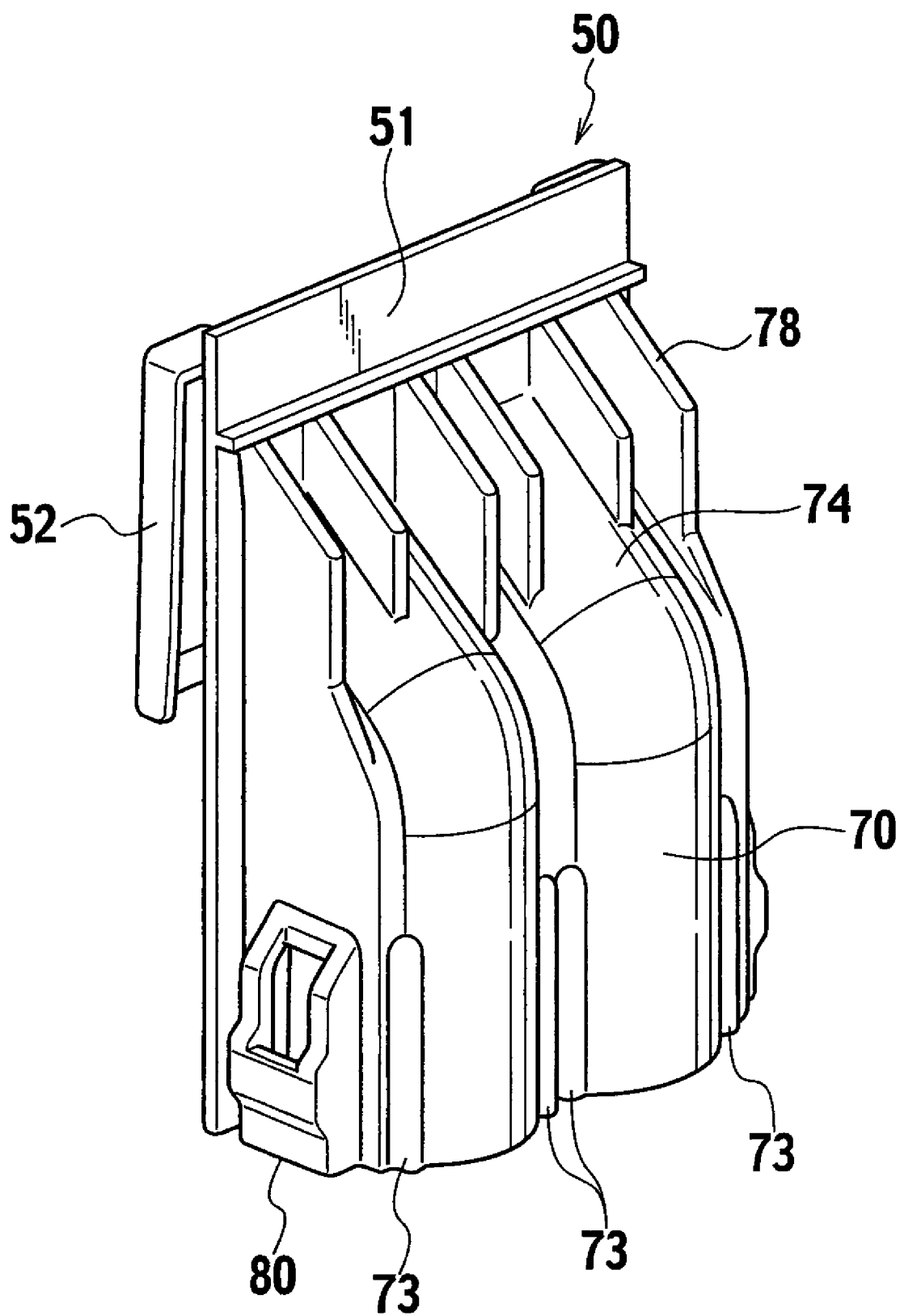
FIG. 3 is a perspective view of the cover, showing its exterior surface.
Figure 4:
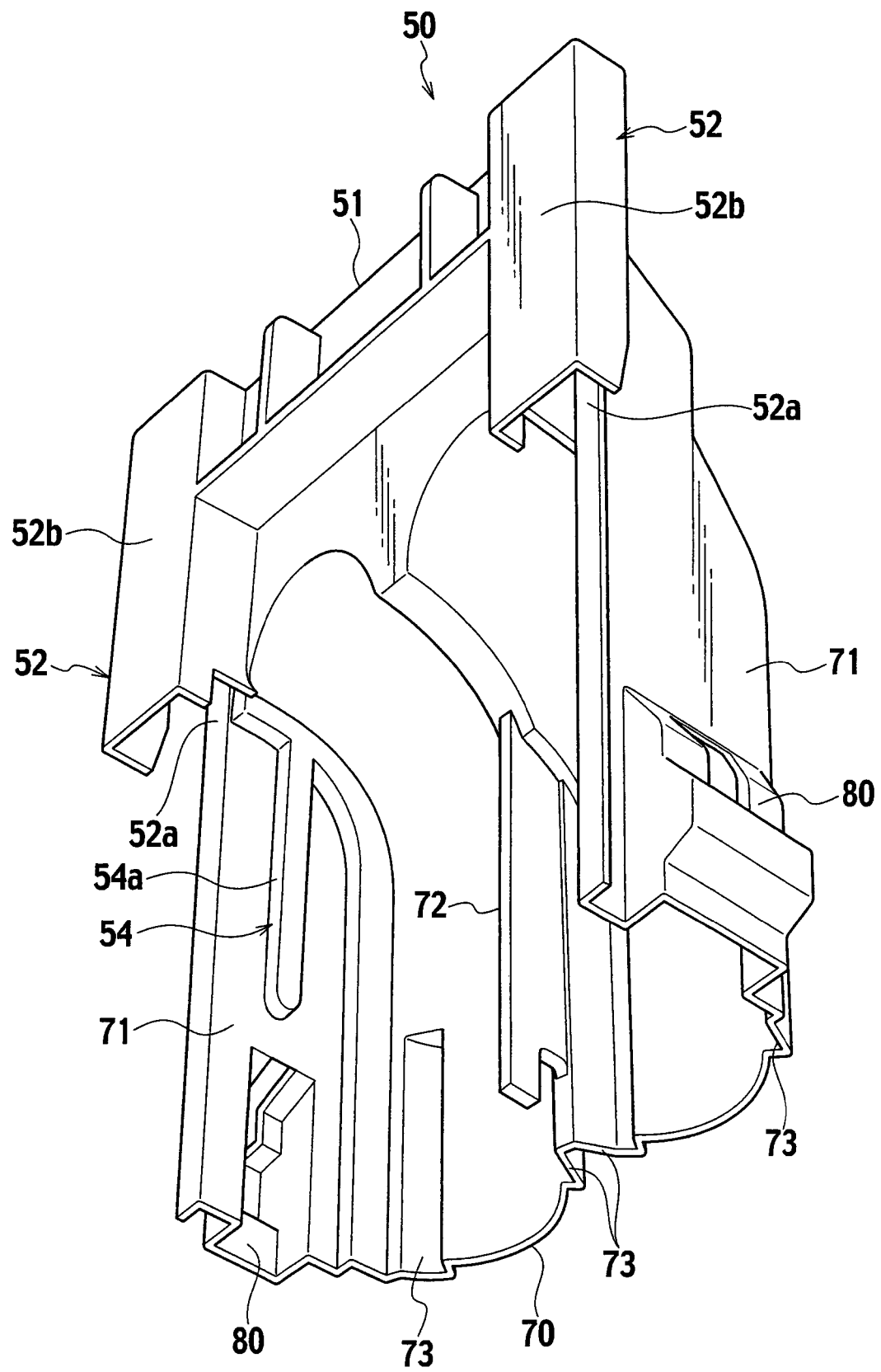
FIG. 4 is a perspective view of the cover, showing its interior surface viewed from the underside obliquely.
Figure 5:
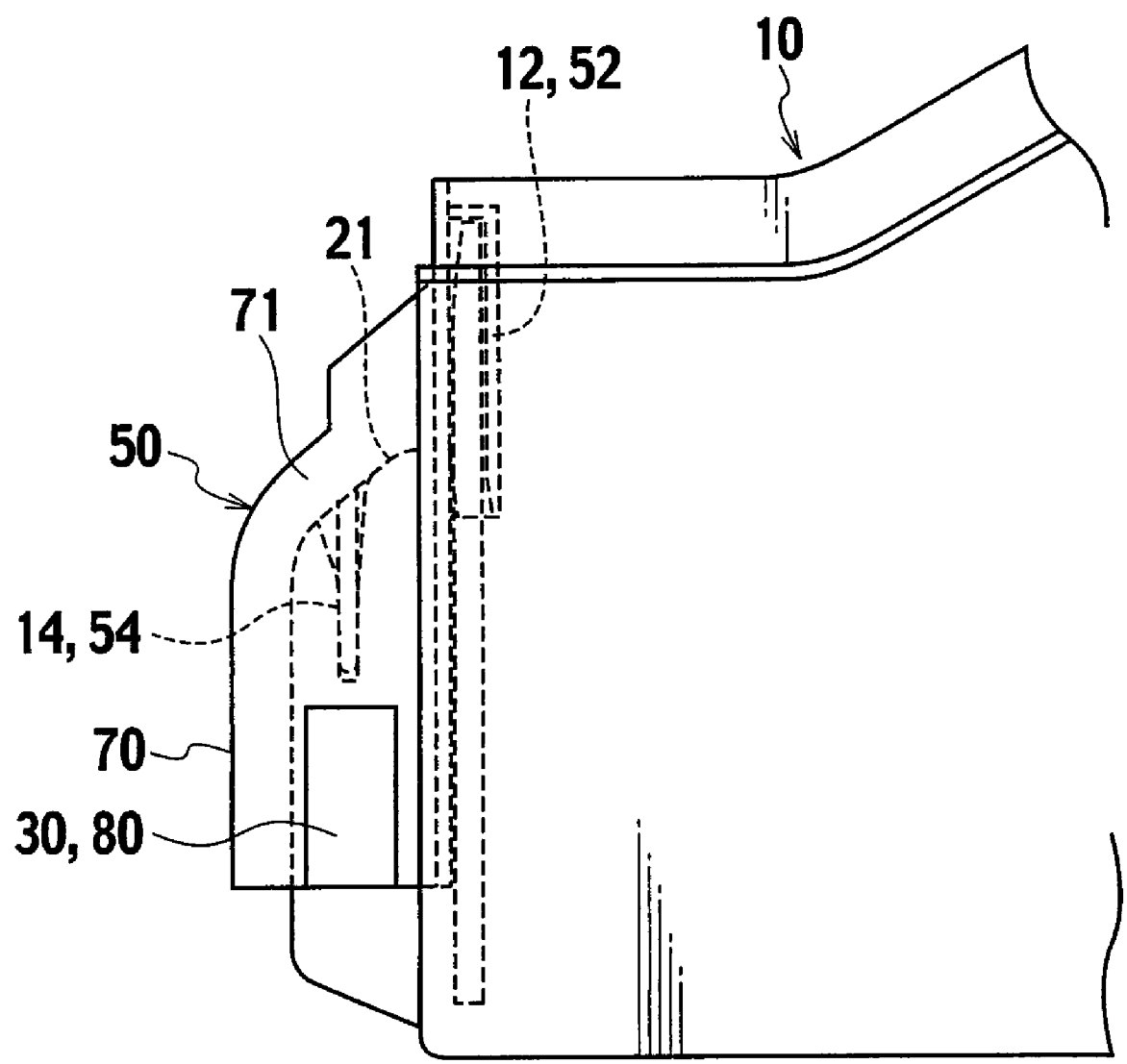
FIG. 5 is a side view of the substantial part of the electrical junction box having the box body and the cover in the assembled state, also eliminating a part of the electrical junction box.
Figure 6:
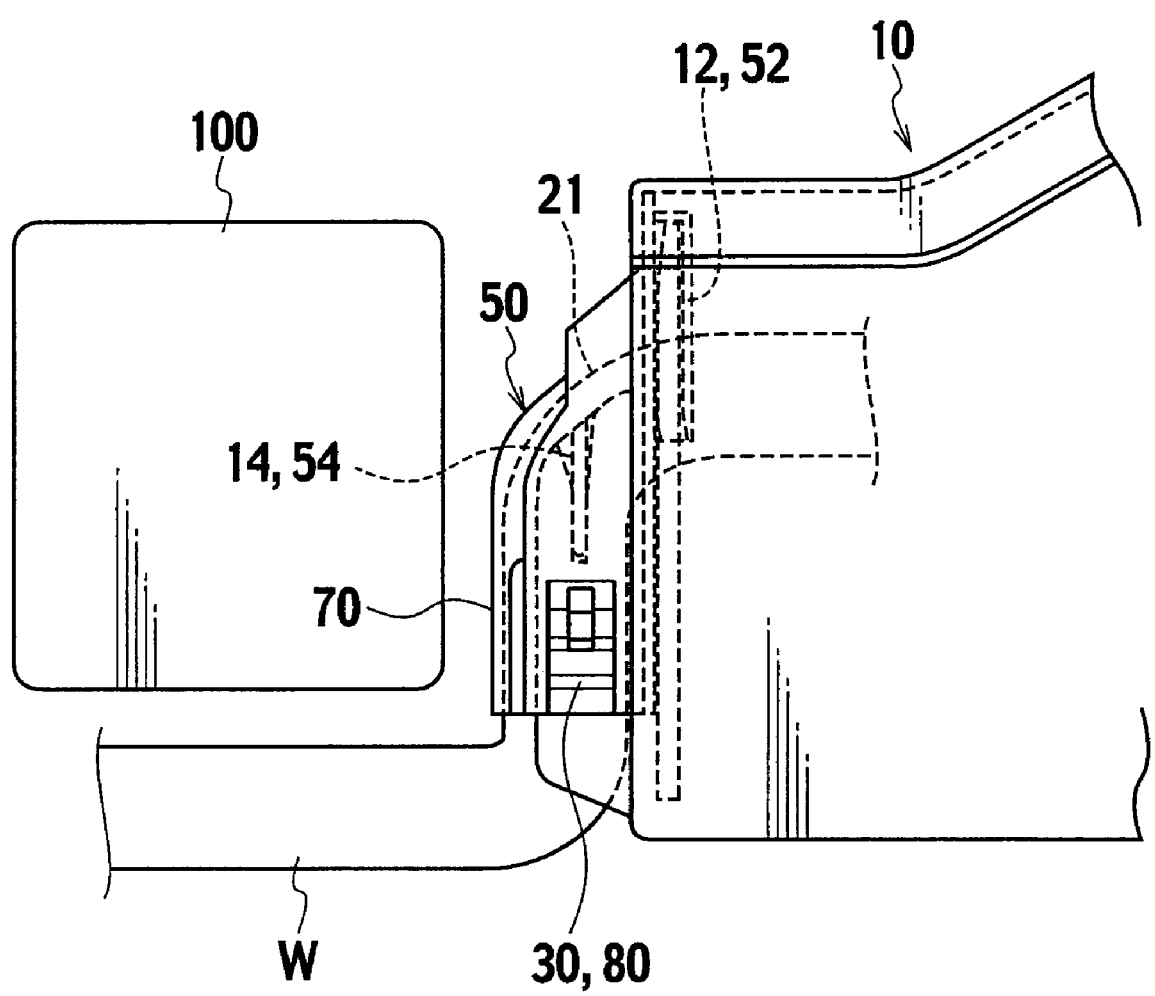
FIG. 6 is a side view of the substantial part of the electrical junction box where the cover is mounted to the box body incorporating a wire harness.

In these figures, FIG. 1 is a perspective view of the substantial part of an electrical junction box having a box body and a cover in an assembled state, in accordance with an embodiment of the present invention, FIG. 2 a perspective view of the substantial part of the box body, FIG. 3 a perspective view of the cover, showing its exterior surface, FIG. 4 a perspective view of the cover, showing its interior surface viewed from the underside obliquely, FIG. 5 a side view of the substantial part of the electrical junction box having the box body and the cover in the assembled state, also eliminating a part of the electrical junction box, and FIG. 6 is a side view of the substantial part of the electrical junction box where the cover is mounted to the box body incorporating a wire harness.

This electrical junction box E comprises a plastic (synthetic resin) box body 10 in which electrical components etc. are accommodated and a plastic cover 50 which is mounted onto an exterior surface of one side of the box body 1 after wiring wire harnesses.

The cover 50 is formed by a slidable waterproof member arranged so as to project from the box body 10. In assembling, the cover 50 is mounted onto the exterior surface of the side of the box body 10 by sliding the member from an upside of the box body 10. In order to allow the sliding movement of the cover 50, the box body 10 is provided, on both sides of its lateral opening 11, with first slide guides 12, 12. Similarly, the cover 50 is provided, on both sides of its front end, with first slide guides 52, 52 for slidable engagement with the first slide guides 12, 12 of the box body 10.

The first slide guides 12, 52 comprise rail-shaped elements in mutual engagement. In operation, when mounting the cover 50 to the box body 10 from its upside, the first slide guides 12, 52 allow the cover 50 to slide in the vertical direction (shown with arrow Y of FIG. 2) freely from while restricting the movement of the cover 50 in the other directions.

As the first slide guides 12, a pair of slide grooves 12a are formed in the box body 10, as shown in FIG. 2. As the first slide guides 52, a pair of projecting walls (protrusion) 52a are formed in the cover 50 to slidably engage in the slide grooves 12a, as shown in FIG. 4. Further, the cover 50 is provided with rail walls 52b of U-shaped cross section that are positioned so as to enclose the slide guides 12 of the box body 10 on condition that the projecting walls 52a are inserted into the slide grooves 12a.

As shown in FIG. 2, each slide groove 12a is provided, at an inlet thereof (in the vicinity of a top end of the groove 12a), with a groove edge 12b slanted to a sliding direction of the cover 50 shown with arrow Y of FIG. 2 Since the slide groove 12 is partially increased in width with the provision of the slanted groove edge 12b, the slide guides 12, 52 between the cover 50 and the box body 10 are established, at respective inlet portions, to have larger plays (allowances) in the cross direction X. The width of the slide groove 12a is gradually narrowed as approaching the lower side of the slide groove 12a in the sliding direction Y. Finally, the width of the slide groove 12a becomes constant since both groove edges defining the slide groove 12a are parallel with each other, establishing small plays in the cross direction X of FIG. 2, which is perpendicular to the sliding direction Y.

Besides, the slide guides 12, 52 are respectively provided with stoppers (not indicated with reference numerals) that restrict further downward movement of the cover 50 after its arrival at a fixed position.

On the exterior surface of the box body's part (10) below the lateral opening 11, a pair of "frontal-open type" wiring grooves 20A, 20B having U-shaped sections are formed to accommodate wire harnesses W, W (FIG. 1) drawn out of the lateral opening 11 and further introduced therefrom downwardly. In the shown embodiment, the wiring grooves 20A, 20B are juxtaposed to each other, having different cross sectional areas corresponding to respective diameters of the wire harnesses W, W to be mounted.

The wiring groove 20A is defined by left and right sidewalls (connecting walls) 21, 22 projecting from the exterior surface of the side of the box body 10. Similarly, the other wiring groove 20B is defined by left and right sidewalls 22, 21 projecting from the exterior surface of the side of the box body 10. Each of the sidewalls 21, 22 is provided, at a tip (projecting end) thereof, with a temporary locking part 23 that restricts slipping of the wire harness W out of the wiring groove 20A (20B). In the embodiment, the temporary locking part 23 is formed by a tip inclined part resulting from inclining the leading edge of the sidewall 21 (22) inwardly. Further, in the longitudinal direction (arrow Y) of the wiring groove 20A (20B), the temporary locking part 23 is formed in the middle portion of the sidewall 21 (22).

As shown in FIGS. 3 and 4, the cover 50 is provided, in its upper portion, with a seal wall 51 for closing up the lateral opening 11 of the box body 10. Below the seal part 51, the cover 50 has a lower half portion formed to have a substantial U-shaped cross section. This lower half portion comprises a front wall 70 having a width generally equal to the width of the seal wall 51 and sidewalls 71 on both sides of the front wall 70. The front wall 70 is shaped to have two semi-cylindrical walls juxtaposed to each other, corresponding to respective curvatures of the wire harnesses W, W. The upper part of the front wall 70 is connected to the lower end of the seal wall 51 through a slanted wall 74. On the exterior surface of the slanted wall 74, a plurality of parallel ribs 78 are formed so as to extend in the vertical direction of the cover 50.

Inside the cover 50, as shown in FIG. 4, a center wall (rib) 72 is formed between the sidewalls 71. Under condition that the cover 50 is mounted onto the box body 10, the sidewalls 71 of the cover 50 are positioned outside the sidewalls 21 of the box body 10. Then, the center wall 72 is inserted into a deflection space 25 between the opposing sidewalls 22. In the assembled state, the sidewalls 71 and the center wall 72 of the cover 50 serve to restrict outward deflections of the sidewalls 21, 22. Note, these walls 71, 72 may be referred to as "restricting walls 71, 72", hereinafter.

Additionally, the restricting walls 71, 72 are provided, at respective base portions, with withstanding parts 73 that abut on the temporary locking parts 23 (FIG. 2) to prevent them from being deflected outwardly.

In the sidewalls 21, 22 on both sides of the wiring grooves 20A, 20B, as shown in FIG. 2, respective top corners 21a, 22a are cut out obliquely or shaped in a curve. The above slanted wall 74 of the cover 50 is provided so as to follow the profiles of the so-formed top corners 21a, 22a of the sidewalls 21, 22.

In order to reinforce the above-mentioned first slide guides 12, 52, the box body 10 and the cover 50 are respectively provided with second slide guides 14, 54.

It will be understood that, in view from the outside of the cover 50 against the box body 10, the second slide guides 14, 54 are positioned on the near side (front side) of a viewer (not shown) in comparison with the former slide guides 12, 52. In other words, as obvious from FIG. 8B, the second slide guides 14, 54 are arranged close to the front wall 70 of the cover 50 in comparison with than the first slide guides 12, 52. Also, as shown in FIG. 5, the second slide guides 14, 54 are positioned in areas where the left and right sidewalls 71 of the cover 50 overlap with the left and right sidewalls 21s of the box body 10. In the cover 50, the second slide guide 54, 54 are arranged on the inside surfaces of the sidewalls 71, 71, in the form of projecting ribs (protrusions) 54a, as shown in FIG. 4. On the other hand, in the box body 10, the second slide guides 14, 14 are arranged on the exterior surfaces of the outermost sidewalls 21, 21, in the form of slide grooves 14a, as shown in FIG. 2. The second slide guides 14, 54 are arranged in parallel with the first slide guides 52, extending over the first slide guides 52 downwardly.

As shown in FIG. 2, each slide groove 14a is provided, at an inlet thereof (in the vicinity of a top end of the groove 14a), with both groove edges slanted to the sliding direction Y of the cover 50. Since the slide groove 14 is partially increased in width with the provision of the slanted groove edges, the second slide guides 14, 54 between the cover 50 and the box body 10 are established, at respective inlet portions, to have larger plays (allowances) in the cross direction X. In the groove edges defining the inlet of the single slide groove 14, particularly, a front one 48b (on the near side of a viewer viewing from the outside of the cover 50 against the box body 10) is greatly slanted to the sliding direction Y in comparison with the rear one of the groove edges. Thus, the box body 10 is configured so that even if assembling the cover 50 in its inclined posture, the slide grooves 14 of the box body 10 could receive respective tips of the ribs 54a of the second slide guides 54 with ease.

Additionally, the width of each slide groove 14a is gradually narrowed as approaching the lower side of the slide groove 14a in the sliding direction Y Finally, the width of the slide groove 14a becomes constant since its opposing groove edges are parallel with each other, establishing small plays in the cross direction X.

The outermost sidewalls 21 of the wiring grooves 20A, 20B serve as connecting walls for supporting the cover 50. As shown in FIG. 1, the electrical junction box E is provided with locking mechanisms 30, 80 on both sides of the box body 10 and the cover 50. The locking mechanisms 30 on the side of the box body 10 are arranged on the exterior surfaces of the outermost sidewall 21, in the form of arm-type projections. While, on the side of the cover 50, the locking mechanisms 80 are arranged on the exterior surfaces of the sidewalls 71, in the form of projecting receptacles for receiving the arm-type projections in their locked state.

The above-mentioned elements forming the electrical junction box E operates as follows.

When assembling the electrical junction box E, it is firstly performed to draw the wire harnesses W out of the box body 10 through its lateral side. In succession, each of the wire harnesses W is led from an upper part of the lateral side downwardly through an interval between the opposing connecting walls (i.e. the sidewalls 21, 22) projecting from the lateral side of the box body 10. Then, the so-led wire harnesses W are mounted into the wiring grooves 20A, 20B, respectively. In connection, each interval between the opposing temporary locking parts 23 on both sides of each groove 20A (20B) is established smaller than the diameter of the wire harness W to be mounted into the relevant groove 20A (20B). Therefore, in the process of mounting the wire harnesses W into the corresponding wiring grooves 20A, 20B, the sidewalls 21 are bent somewhat outwardly, while the opposing sidewalls 22 are bent somewhat inwardly so as to get close to each other. Once the wire harnesses W, W have been mounted into the wiring grooves 20A, 20B, the sidewalls 21, 22 return to their original positions. In this state, since the temporary locking parts 23 operate to hold on the wire harnesses W being mounted into the wiring grooves 20A, 20B temporarily, it is possible to prevent the wire harnesses W from jumping out of the wiring grooves 20A, 20B due to their properties of rebound (i.e. elasticity).

Next, it is performed to attach the cover 50 to the box body 10. In detail, the cover 50 is slid downwardly while maintaining a condition that the slide guides 52, 54 (i.e. the projecting walls 52a and the ribs 54a) are engaged with the slide guides 12, 14 (i.e. the slide grooves 12a, 14a) of the box body 10. In the final state of the sliding of the cover 50, the locking mechanisms 30, 80 are locked up. In this way, as the cover 50 can be fixed in a fixed position of the box body 10 by only sliding the cover 50 downwardly with the aid of guidance by the first and second slide guides 12, 52, 14 and 54, it is possible to attach the cover 50 to the box body 10 easily and smoothly.

When the cover 50 is mounted in the fixed position, the restricting walls of the cover 50, namely, the sidewalls 71 and the center wall (rib) 72) are arranged outside the sidewalls 21 of the wiring grooves 20A, 20B and also inserted into the deflection space 25 between the sidewalls 22, while the withstanding parts 73 abut on respective outside surfaces of the temporary locking parts 23. Consequently, outward bending of the sidewalls 21, 22 is suppressed by the restricting walls 71, 72 and additionally, outward deflection of the temporary locking parts 23 can be prevented by the withstanding parts 73.

In this way, the electrical junction box E can hold the wire harnesses W, W strongly and certainly. That is, with the implementation of double-engagement by both the temporary locking parts 23 of the box body 10 and the restricting walls (the sidewalls 71, the rib 72) of the cover 50, it is possible to improve retaining force of the electrical junction box E against the wire harnesses W.

Further, as the provision of the first slide guides 12, 52 and the second slide guides 14, 54 allows the cover 50 to be slidable in a direction (arrow Y) to intersect with the mounting direction (arrow X) of the wire harnesses W into the wiring grooves 20A, 20B, there is no possibility of the cover 50 being detached from the box body 10 due to the resilience of the wire harnesses W.

As the temporary engagement for wire harnesses is accomplished by the temporary locking parts 23 at the same time of mounting the wire harnesses W, W into the wiring grooves 20A, 20B, it is possible for a worker to fix the cover 50 in the fixed position on the box body 10 without feeling nervous above rebound phenomenon of the wire harnesses, saving assembling labor and time.

With the structure where the cover 50 is mounted upon engaging the wire harnesses W into the wiring grooves 20A, 20B, it is possible to compellingly set the wiring route for harnesses W on a route sneaking through the underside of the obstacle 100 without using any superfluous component (e.g. clip, protector), as shown in FIG. 6. Thus, a worker's burden in assembling the wire harnesses W can be reduced as well as reduction in manufacturing cost.

Additionally, since the wire harnesses W are protected by the cover 50, it is possible to enhance the water proofing property of the electrical junction box E.

Still further, as the wire harnesses W can be detached from the box body 10 by only detaching the cover 50 and successively pulling out the wire harnesses W, W, the electrical junction box of the embodiment is superior to disassembling property, providing a contribution in aspect of the recycling of resources.

Additionally, as the first slide guides 12, 52 and the second slide guides 14, 54 for sliding the cover 50 are separated from each other in the cross direction X, in other words, two different positions (inner-side and outer-side) in view from the outside of the cover 50, it is possible to reduce looseness (rattling) of the cover 50. The cover 50 may have the first slide guides 52, 52 on each leading end of the sidewalls 71, 71.

Figure 9A:
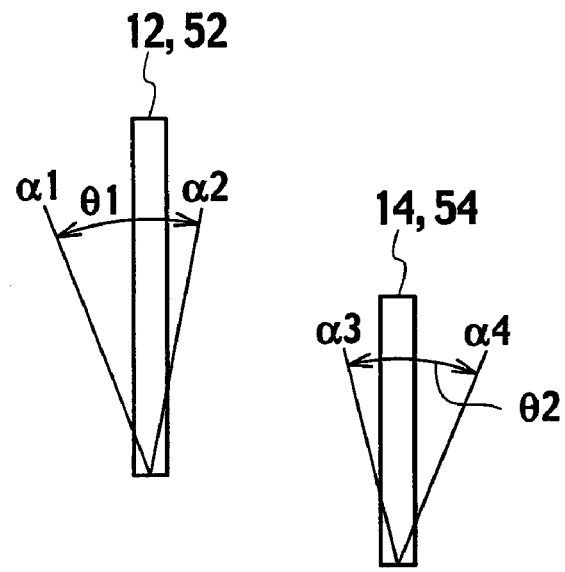
Figure 9B:
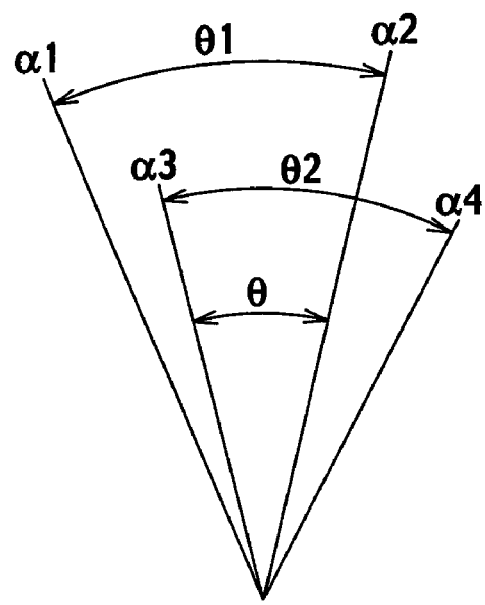

The principle of enabling a reduction in the looseness of the cover 50 will be described with reference to FIGS. 9A, 9B. Assume in FIG. 9A, a play angle θ1 about the first slide guides 12, 52 coincides with an angular range between lines α1 and α2, while a play angle θ2 about the second slide guides 14, 54 coincides with an angular range between lines α3 and α4. Then, as shown in FIG. 9B, an overlapping range θ of the former range with the latter range, that is, an angular range between lines α3 and α2 represents an overall play angle of the cover 50. Consequently, as the total amount of play is reduced by the provision of the first and second slide guides 12, 52, 14 and 54, it is possible to reduce the looseness of the cover 50.

Figure 7A:
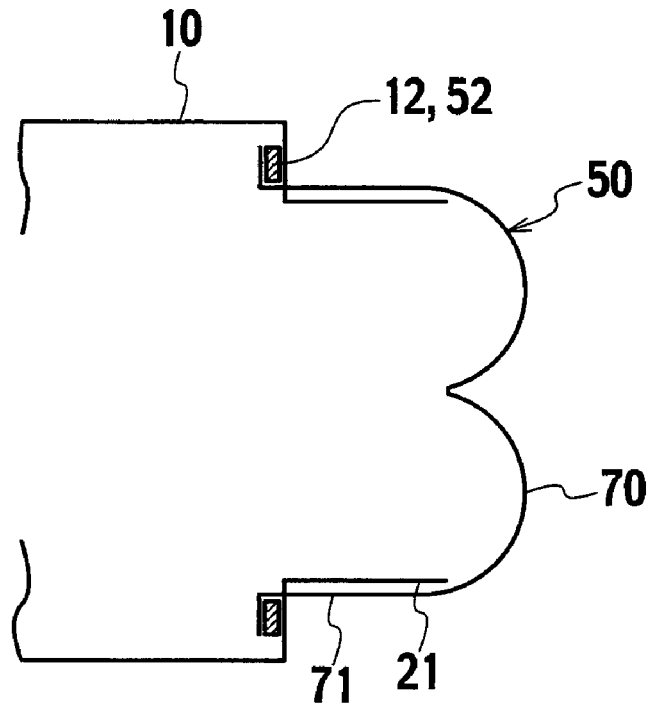
FIG. 7A is a typical plan view of an arrangement (comparative example) where only a first slide guide is arranged between the box body and the cover.
Figure 7B:
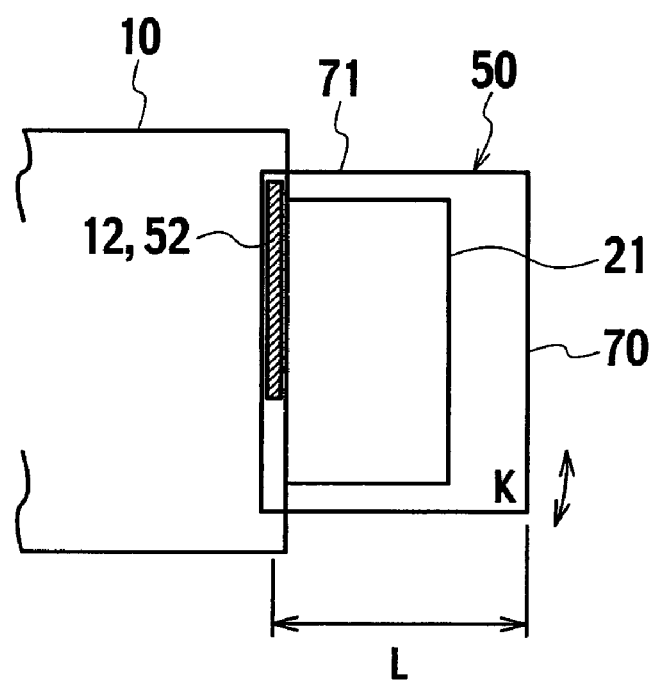
FIG. 7B is a typical side view of the arrangement.
Figure 8A:
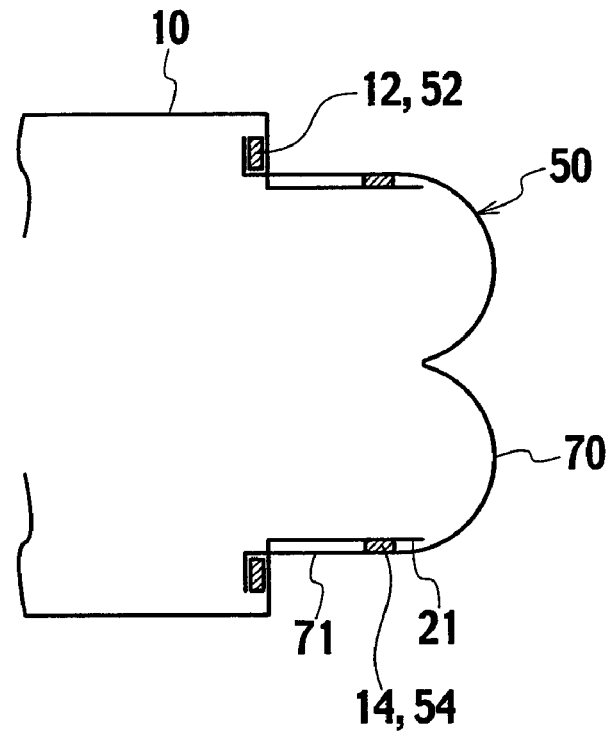
FIG. 8A is a typical plan view of an arrangement (present invention) where a first slide guide and a second slide guide are arranged between the box body and the cover.

Additionally, owing to the provision of the second slide guides 14, 54 on the near side of a viewer (worker), it is possible to reduce a displacement of a lower end of a front wall of the cover 50 under a great influence of the looseness of the cover 50. That is, as shown in FIGS. 7A and 7B, if the electrical junction box is provided with only the first slide guides 12, 52 at the leading end of the cover 50, a displacement of the lower end K of the front wall 70 of the cover 50 gets large (in comparison with the present electrical junction box under the same angle of looseness) because a distance L between the lower end K and the first slide guides 12, 52 is large. According to the present electrical junction box E that is provided with not only the first slide guides 12, 52 but also the second slide guides 14, 54 on the near side, as shown in FIGS. 8A and 8B, it is possible to reduce the displacement of the lower end K of the front wall 70 because of its smallness in the distance L.

Figure 8B:
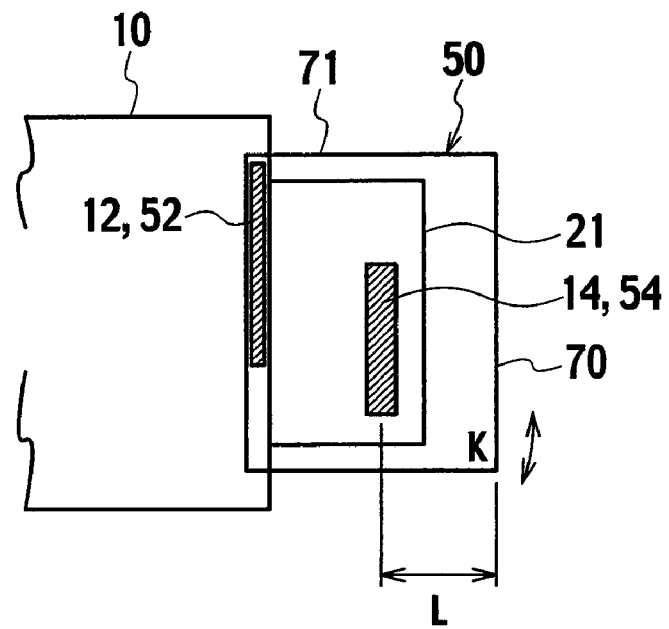
FIG. 8B is a typical side view of the arrangement.

Additionally, since the second slide guides 14, 54 are lower than the first slide guides 12, 52 as shown in FIG. 8B, the positioning of the first and second slide guides 14, 54 allows the looseness of the lower end K of the front wall 70 of the cover 50 to be further reduced because the lower end K is close to the second slide guides 14, 54.

In the embodiment, since the temporary locking parts 23 are formed in only respective middle portions of the sidewalls 21, 22 in the longitudinal direction of the wiring grooves 20A, 20B, it is possible to moderate the restriction for the wire harnesses W in both upper and lower portions of the wiring grooves 20A, 20B. Accordingly, if mounting the wire harness W into the wiring groove 20A (20B) through its upper portion, the wire harness W can be easily mounted into the groove 20A (20B) under no influence of the temporary locking parts 23 on both sides at the initial stage of mounting operation. Thus, the temporary locking parts 23 become effective only after the wire harness W has been mounted into the groove 20A (20B) to some extent degree. Also, when pulling the wire harness W out of the groove 20A (20B) through the lower portion, the wire harness W can be pulled out smoothly since the temporary locking parts 23 do not make resistance at the initial stage of a worker's pulling operation.

Further, since the sidewalls 21, 22 of the wiring grooves 20A, 20B have the top corners 21a, 22a cut out obliquely or in a curve, a worker can mount the wire harnesses W, W into the wiring grooves 20A, 20B easily without fearing that the wire harnesses W, W might hook on the corners 21a, 22a accidentally. In connection, as the cover 50 is formed with the slanted wall 74 according with the so-formed corners 21a, 22a, it is possible to bear down on the wire harnesses W, W appropriately.

According to the embodiment, still further, as the first and second slide guides 12, 52, 14 and 54 are together constructed so that the play (allowance) in the cross direction X is relatively large at each inlet and also gets smaller as advancing deeper in the sliding direction Y, a worker can engage the cover 50 with the box body 10 easily with the large play at the initial stage of mounting. Nevertheless, the worker could fix the cover 50 in the appropriate position on the box body 10 closely as a result of removing the play at the closing stage of mounting.

Figure 10A:
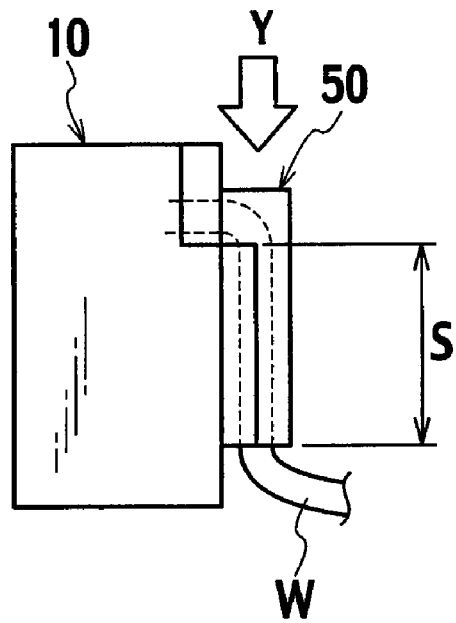

In case of the wiring route of the wire harness W shown in FIG. 10A, conventionally, there is the possibility that when mounting the cover 50 from above in the direction of arrow Y, the cover 50 might be inserted while strongly rubbing its body against the wire harness W in the range shown with alphabet s in FIG. 10A due to the harness property of rebound (i.e. elasticity) or its largeness in diameter. On the contrary, according to the present invention, there is less possibility of such rubbing of the cover 50 during the mounting operation.

Figure 10B:
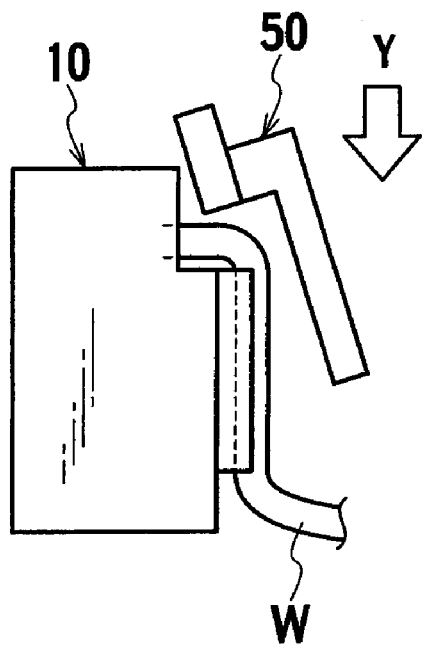
Figure 11:
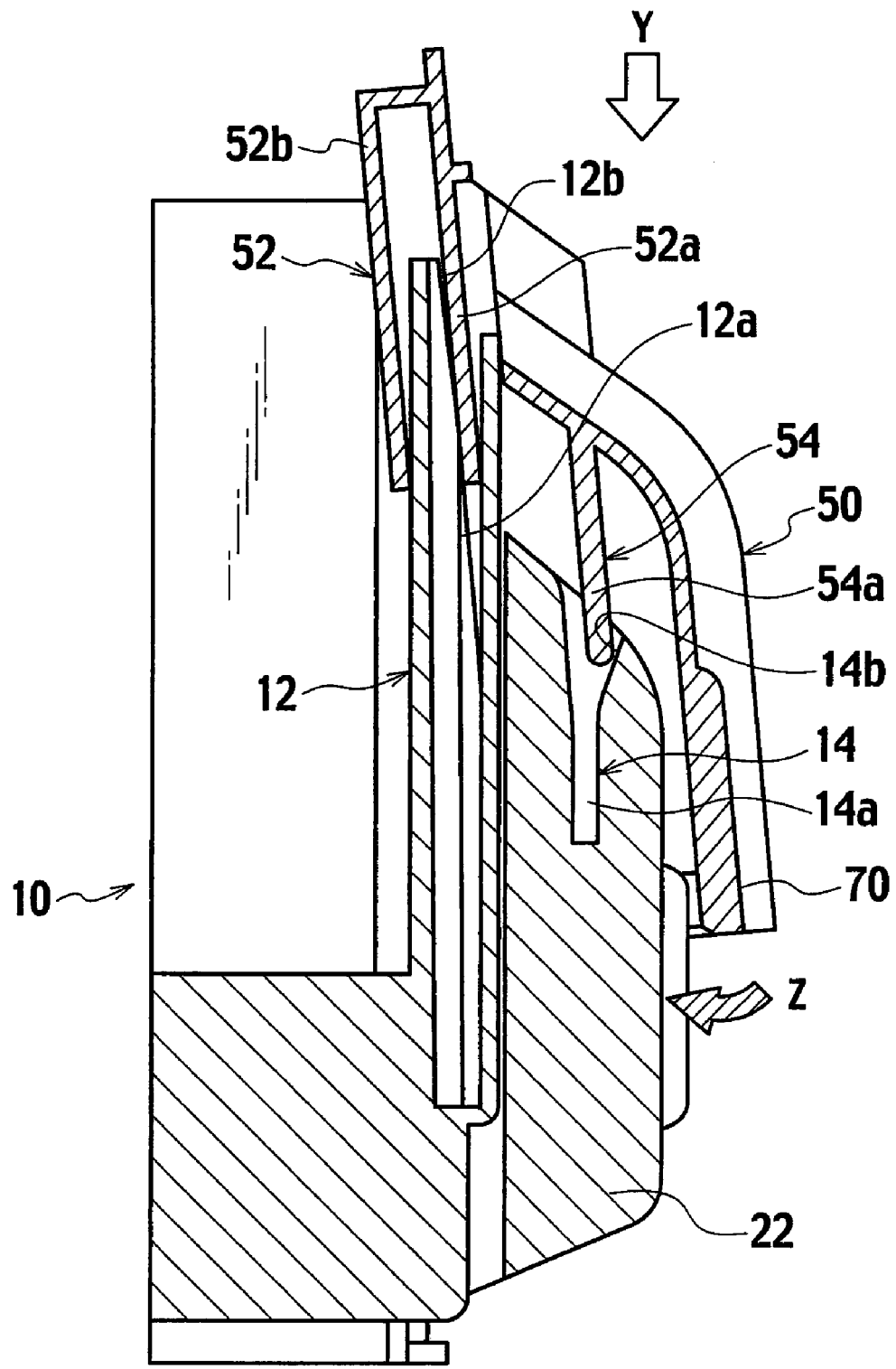
FIG. 11 is a side view showing an initial posture of the cover in order to dissolve the wear issue about the wire harness in mounting the cover to the box body.

In detail, as shown in FIGS. 10B and 11, the posture of the cover 50 has a great degree of freedom at the initial stage of mounting the cover 50 due to the above largeness in the plays of the slide guides 12, 52, 14 and 54. Consequently, it is possible for a worker to insert the cover 50 into the box body 10 while being somewhat inclined so as to cause the cover's lower part to open to the outside of the electrical junction box, so that the cover 50 can be mounted to the box body 10 without applying unreasonable stress on the wire harness W. During the mounting operation, as shown in FIG. 11, the tip of the rib 54a (as the second slide guide 54) of the cover 50 is inserted into the slide groove 14a while being caught by the slanted edge 14b of the slide groove 14 on the side of the box body 10 certainly.

Figure 10C:
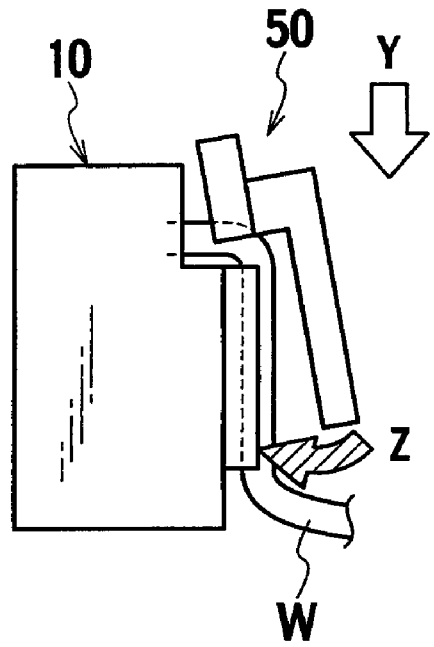
Figure 12:
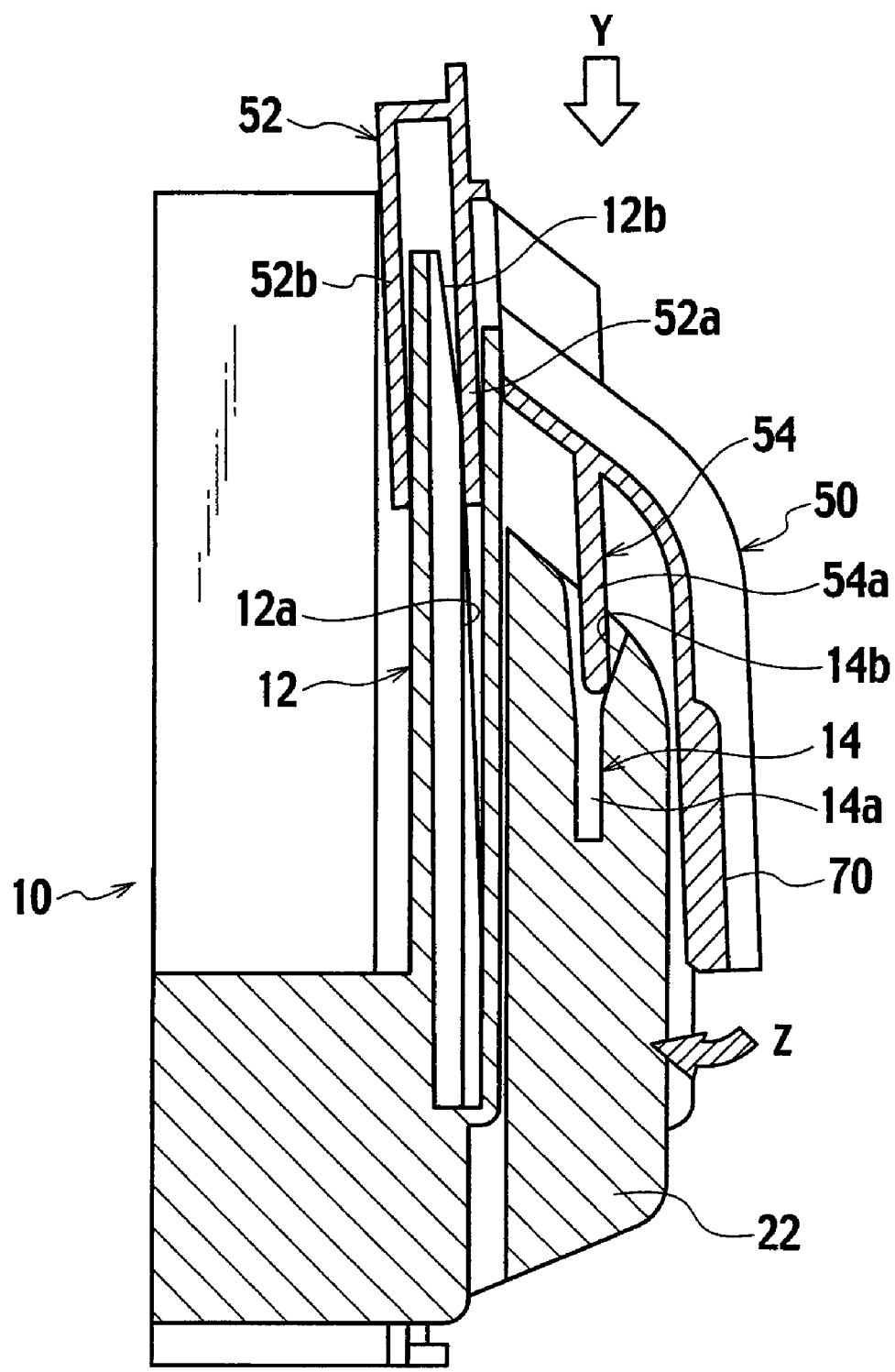
FIG. 12 is a side view showing the cover at the next stage following FIG. 11.

With the progress of mounting at the closing stage, as shown in FIGS. 10C and 12, the widths of the slide grooves 12a, 14a are gradually decreased to reduce respective plays in the cross direction X, so that the restricting function by the first and second slide guides 12, 52, 14 and 54 becomes more effective. Consequently, as the lower end of the cover 50 is attracted toward the box body 10 as shown with arrow Z of FIG. 11, the cover 50 is brought into the final position while bearing down the wire harness W.

Figure 13:
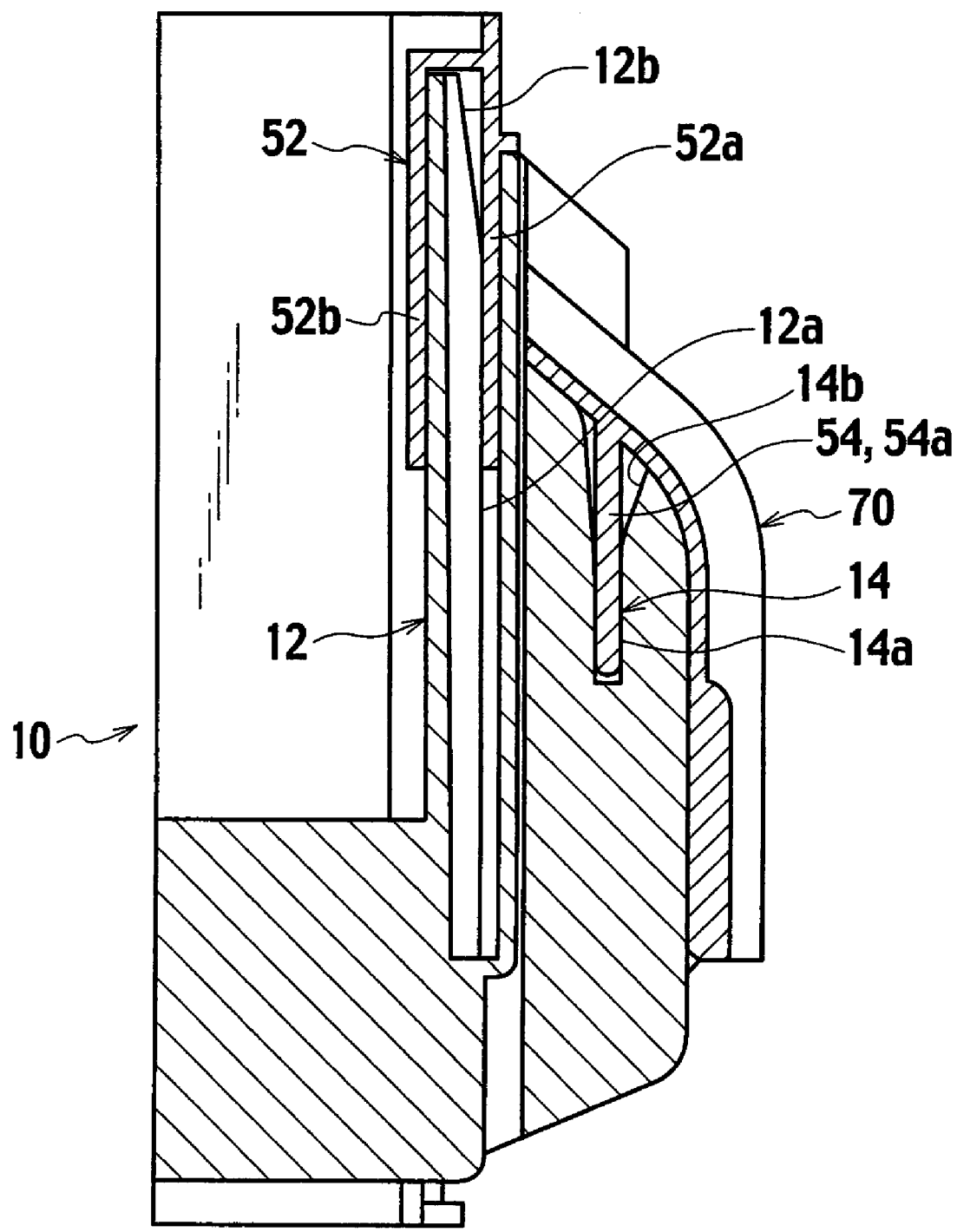
FIG. 13 is a side view showing a stage of completing the mounting operation.

In this way, according to the embodiment, it is possible to alleviate the phenomenon where the wire harness W apt to rebound is severely rubbed by the cover 50 during the mounting operation. In other words, while combining the prevention of damage on the outer periphery of the wire harness W with the reduction of a worker's burden in mounting the cover 50, it can be mounted to the box body 10, realizing the completed state of FIG. 13 where the cover 50 is bearing down on the wire harness W certainly.

It will be understood by those skilled in the art that the foregoing descriptions are nothing but one embodiment of the disclosed electrical junction box and therefore, various changes and modifications may be made to the present invention without departing from the spirit and scope of the invention. For example, although the illustrated box body 10 is provided with two wiring grooves 20A, 20B, the box body 10 may be provided with a single wiring groove. Alternatively, the same body 10 may be provided with three or more wiring grooves.

What is claimed is:

1. An electrical junction box comprising,
   a box body configured to accommodate an electrical component, the box body having a pair of left and right connecting walls formed to project from a lateral side of the box body outwardly; and
   a cover to be slidably mounted on the lateral side of the box body from above, the cover having a front wall and a pair of left and right sidewalls connected to both left and right ends of the front wall to provide a U-shaped cross section, the left and right sidewalls overlapping with the left and right connecting walls of the box body under condition that the cover is mounted to the box body, wherein
   both of the cover and the box body have first slide guides to guide a downward sliding of the cover in mounting from the above,
   both of the cover and the box body have second slide guides to guide the downward sliding of the cover in mounting from the above, and
   the second slide guides are positioned in areas where the left and right sidewalls of the cover overlap with the left and right connecting walls of the box body, the second slide guides being closer to the front wall of the cover mounted to the box body than the first slide guides.

2. The electrical junction box as claimed in claim 1, wherein
   the second slide guides are arranged so as to extend downwardly of the first slide guides in a sliding direction of the cover in mounting.

3. The electrical junction box as claimed in claim 1, wherein
   the first slide guides and the second slide guides are constructed so that a play for the cover in a direction perpendicular to a sliding direction of the cover in mounting is large at each inlet of the first and second slide guides and gets smaller as advancing deeper in the sliding direction.

4. The electrical junction box as claimed in claim 3, wherein
   each of the first slide guides and the second slide guides includes slide grooves formed on the box body and protrusions formed on the cover to slidably engage in the slide grooves respectively, and
   a groove edge defining each of the slide grooves at the inlet is slanted to the sliding direction of the cover, thereby providing the play being large at the inlet.

5. The electrical junction box as claimed in claim 1, wherein
   the cover is an element to be mounted to the box body after wiring a wire harness on an exterior surface of the lateral side of the box body, the wired wire harness being pressed by the mounted cover,
   the box body has a frontal-open type wiring groove formed on the exterior surface to accommodate the wire harness drawn out of the box body through the lateral side and further led from an upper part of the lateral side downwardly, the wire groove having a U-shaped cross section, and
   the pair of left and right connecting walls are arranged on both sides of the wiring groove.

6. The electrical junction box as claimed in claim 1, wherein
   the cover has the first slide guides on each leading end of the left and right sidewalls of the cover.

7. A method of assembling an electrical junction box, the method comprising the steps of:
   preparing a wire harness, a box body configured to accommodate an electrical component, the box body having a pair of left and right connecting walls formed to project from a lateral side of the box body outwardly, and a cover to be slidably mounted on the lateral side of the box body from above, the cover having a front wall and a pair of left and right sidewalls connected to both left and right ends of the front wall to provide a U-shaped cross section, the left and right sidewalls overlapping with the left and right connecting walls of the box body under condition that the cover is mounted to the box body, wherein both of the cover and the box body have first slide guides to guide a downward sliding of the cover in mounting from the above, both of the cover and the box body have second slide guides to guide the downward sliding of the cover in mounting from the above, and the second slide guides are positioned in areas where the left and right sidewalls of the cover overlap with the left and right connecting walls of the box body, the second slide guides being closer to the front wall of the cover mounted to the box body than the first slide guides;
   drawing the wire harness out of the box body through the lateral side of the box body;
   successively leading the wire harness from an upper part of the lateral side of the box body downwardly through an interval between the pair of the left and right connecting walls projecting from the lateral side of the box body, and
   mounting the cover to the box body while engaging the first and second slide guides of the cover with the first and second slide guides of the box body, wherein
   the mounting step includes:
      inserting the cover into the box body while inclining the cover so that a cover's lower end opens to an outside of the box body at an initial stage of the mounting step, and
      inserting the cover into the box body while attracting the cover's lower end to the box body with guidances of the first and second slide guides at a final stage of the mounting step.

* * * * *